United States Patent [19]

Schuettpelz

[11] Patent Number: 5,375,186
[45] Date of Patent: Dec. 20, 1994

[54] DEVICE FOR SPEED STABILIZATION OF A MOTOR EMPLOYING PHASE COMPARISON

[75] Inventor: Gerd Schuettpelz, Damp, Germany

[73] Assignee: Linotype-Hell AG, Eschborn, Germany

[21] Appl. No.: 82,040

[22] Filed: Jun. 24, 1993

[30] Foreign Application Priority Data

Jul. 1, 1992 [DE] Germany .................. 4221619

[51] Int. Cl.⁵ .......................................... H02P 5/165
[52] U.S. Cl. .................................... 388/812; 388/813; 388/901; 388/906; 388/911; 388/915; 318/609; 318/610
[58] Field of Search ............... 388/800, 803–805, 388/809–823, 901, 906, 907.5, 911, 915–916, 917; 318/609, 610, 611, 636, 606–608

[56] References Cited

U.S. PATENT DOCUMENTS

| 2,582,541 | 6/1971 | Hebb | 178/6.6 |
|---|---|---|---|
| 3,983,316 | 9/1976 | Schopp | 178/6.6 P |
| 4,041,367 | 8/1977 | Gold et al. | 363/97 |
| 4,193,020 | 3/1980 | Song | |
| 4,211,964 | 7/1980 | Yabu et al. | |
| 4,366,399 | 12/1982 | Furuhata | 307/519 |
| 4,371,818 | 2/1983 | Lewis | 318/313 |
| 4,381,478 | 4/1983 | Saijo et al. | 318/135 |
| 4,382,234 | 5/1983 | Olbrechts | 331/10 |
| 4,463,390 | 7/1984 | Koga et al. | 360/10.3 |
| 4,536,685 | 8/1985 | Fattal et al. | 318/254 |
| 4,538,096 | 8/1985 | Kern | 318/314 |
| 4,818,922 | 4/1989 | Sears et al. | 318/313 |
| 4,914,474 | 4/1990 | Townsend | 355/64 |
| 4,999,556 | 3/1991 | Masters | 318/599 |

FOREIGN PATENT DOCUMENTS

| 2424254A1 | 3/1974 | Germany | H02K 29/02 |
|---|---|---|---|
| 2156389B2 | 10/1978 | Germany | H02P 5/16 |
| 2161326B2 | 2/1980 | Germany | H02P 5/16 |
| 3315842A1 | 11/1983 | Germany | H02P 5/16 |
| 3400198A1 | 7/1985 | Germany | H02P 5/06 |
| 3216027C2 | 10/1985 | Germany | H04N 5/783 |
| 3412235A1 | 10/1985 | Germany | H02P 6/00 |
| 3048673C2 | 6/1986 | Germany | G01R 23/02 |
| 656992A5 | 7/1986 | Switzerland | H02P 6/02 |
| 1369797 | 10/1974 | United Kingdom | H02P 5/12 |
| 1529393 | 10/1978 | United Kingdom | G05D 13/62 |
| 460497 | 8/1985 | U.S.S.R. | G01P 3/46 |
| 1390763A1 | 4/1988 | U.S.S.R. | H02P 6/00 |
| 1390763A1 | 4/1988 | U.S.S.R. | H02P 6/00 |
| 1467726A1 | 3/1989 | U.S.S.R. | H02P 6/00 |
| 1688165A1 | 10/1991 | U.S.S.R. | G01P 3/36 |

OTHER PUBLICATIONS

Patent Abstracts of Japan, vol. 4, No. 86, Jun. 20, 1980, "Speed Adjustment Unit", Tadashi Saitou.
Patent Abstracts of Japan, vol. 11, No. 373, Dec. 5, 1981, "Digital Phase Comparison Method", Yoshiro Tsuchiyama.

Primary Examiner—William M. Shoop, Jr.
Assistant Examiner—David Martin
Attorney, Agent, or Firm—Hill, Steadman & Simpson

[57] ABSTRACT

An apparatus for stabilizing the speed of a motor has a phase comparator that identifies a phase difference between a reference signal and a speed signal. The apparatus acquires the speed of the motor and generates an output signal proportional to the identified phase difference. A controller receives the output signal. A control circuit for the motor is connected to the controller. The phase comparator comprises a sample-and-hold element, a sampling pulse shaper that is connected thereto and is input with the speed signal, a pulse shaper input with the reference signal, and a signal generator connected to the output of the pulse shaper and to the input of the sample-and-hold element.

13 Claims, 3 Drawing Sheets

DEVICE FOR SPEED STABILIZATION OF A MOTOR EMPLOYING PHASE COMPARISON

BACKGROUND OF THE INVENTION

The invention relates to the field of drive technology and is directed to an apparatus for stabilizing the speed of a motor. A phase comparator is provided having a sample-and-hold element and a sampling pulse shaper connected therewith and input with a speed signal. The phase comparator identifies the phase difference between a reference signal and the speed signal that acquires the speed of the motor and generates an output signal proportional to the identified phase difference. A controller is input with the output signal. A control circuit for the motor is connected to the controller.

Such an apparatus is known, for example, from the textbook "Halbleiter-Schaltungen", Tietze/Schenk, Axel Springer Verlag, 9th Edition, pages 954–959. The PLL control described therein makes it possible to couple a DC motor to a reference signal in phase-locked fashion, given employment of a phase comparator. Such controls, however, usually have a dead zone that opposes a high-precision control. This dead zone results since the known phase comparators only offer a pulse sequence that has a pulse width proportional to the phase difference. The pulse sequence is smoothed in a following RC element that represents an integrator. The pulse width, however, cannot become arbitrarily narrow and thereby simultaneously has properties proportional to the phase difference. Due to the employment of non-ideal components and running or transit times resulting therefrom, a minimum width of the pulses must thus be taken into consideration.

SUMMARY OF THE INVENTION

It is therefore an object of the present invention to design an apparatus for stabilizing the speed of a motor such that a stable speed can be realized within a broad range of control.

According to the invention, an apparatus is provided for stabilizing speed of a motor. A phase comparator has a sample-and-hold element and a sampling pulse shaper connected to the sample-and-hold element. The phase comparator identifies the phase difference between a reference signal and the speed signal, the speed signal representing the speed of the motor. The phase comparator generates an output signal that is proportional to the identified phase difference. The controller is input with the output signal from the phase comparator. A control circuit for the motor is connected to the controller. The phase comparator also has a pulse shaper input with the reference signal. A signal generator is connected to the output of the pulse shaper and to the input of the sample-and-hold element.

The invention shall be set forth in greater detail below with reference to FIGS. 1 through 3.

DESCRIPTION OF THE PREFERRED EMBODIMENTS

Figure 1:
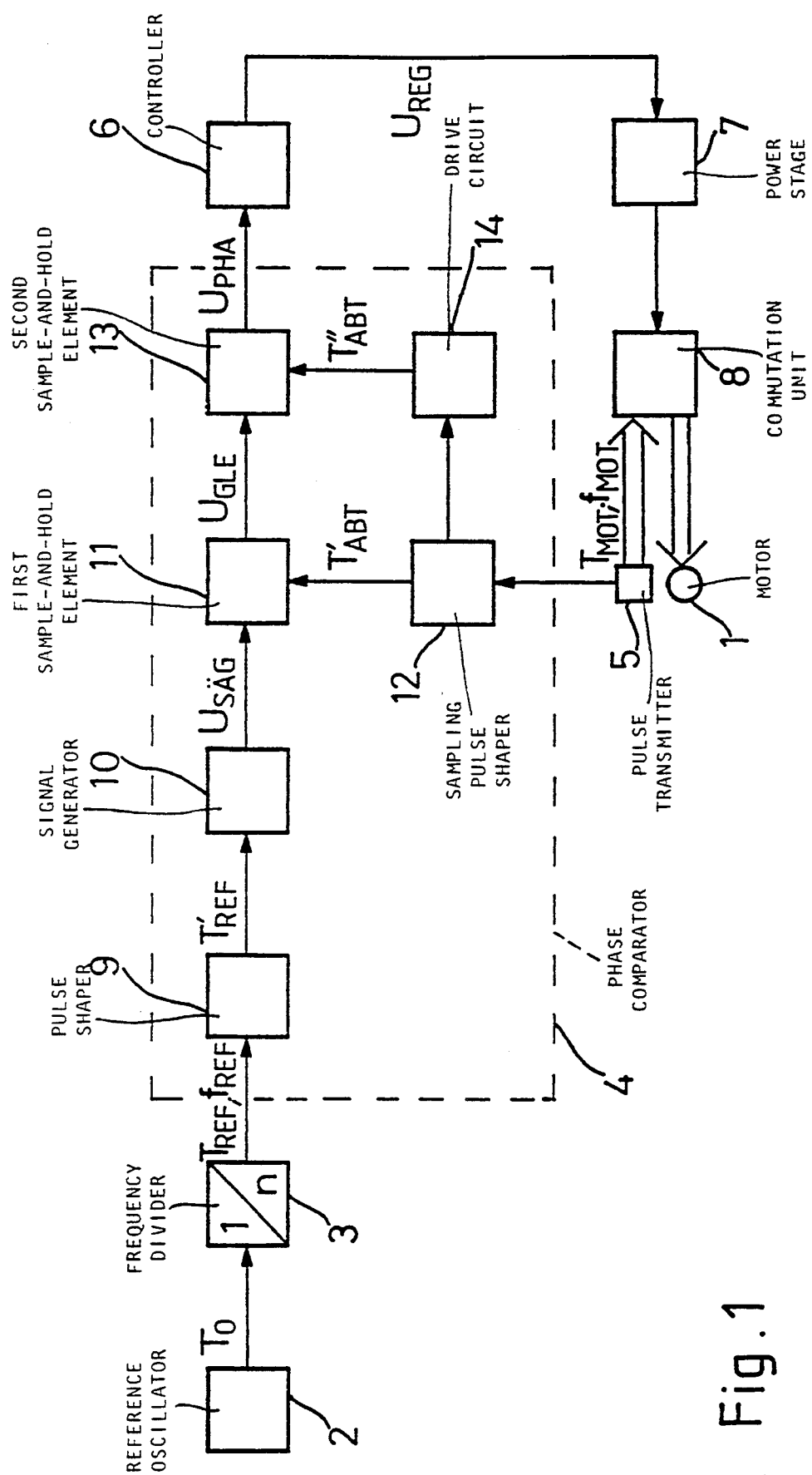
FIG. 1 is a schematic block circuit diagram of an apparatus for speed stabilization.

FIG. 1 shows a schematic block circuit diagram of an apparatus for stabilizing the speed of a motor 1. A reference oscillator 2 generates a clock sequence $T_O$ that is divided down in a following frequency divider 3 to a reference clock sequence $T_{REF}$ having the reference frequency $f_{REF}$. The reference clock sequence $T_{REF}$ is supplied to a phase comparator 4. A pulse transmitter 5 that, for example, is designed as a Hall sensor generates a motor clock sequence $T_{MOT}$ whose motor frequency $F_{MOT}$ is proportional to the actual speed of the motor 1. The motor clock sequence $T_{MOT}$ is likewise supplied to the phase comparator 4. The phase difference between the reference frequency $f_{REF}$ and the motor frequency $f_{MOT}$ is continuously identified in the phase comparator 4, and a phase difference signal $U_{PHA}$ that is proportional to the phase difference is generated as an output signal of the phase comparator 4. The phase difference signal $U_{PHA}$ is converted into a regulating signal $U_{REG}$ in a controller 6, this regulating signal $U_{REG}$ being supplied to a power stage 7. The controller 6 is preferably a (proportional integral and differential) controller. A motor control circuit is said to consist of the power stage 7 and a commutation unit 8. The power stage 7 in the illustrated exemplary embodiment is connected to the motor 1 via a commutation unit 8.

The phase comparator 4 is composed of a pulse shaper 9 that, for example, is designed as a monoflop and is triggered by the reference clock sequence $T_{REF}$. The pulse shaper 9 generates a modified reference clock sequence $T'_{REF}$ having a prescribable, constant pulse duration. The speed of the motor 1 is prescribed via the respective period of the modified reference clock sequence $T'_{REF}$. A sawtooth voltage $U_{SAG}$ is generated from the modified reference clock sequence $T'_{REF}$ of the pulse shaper 9 in a following signal generator 10 that, for example, is designed as a sawtooth generator. The sawtooth voltage $U_{SAG}$ charges a first sample-and-hold element 11. The first sample-and-hold element 11 is triggered by a first sampling pulse sequence $T'_{ABT}$ that is derived from the motor clock sequence $T_{MOT}$ in a sampling pulse shaper 12 in the form, for example, of a monoflop. The output signal of the first sample-and-hold element 11 is a DC voltage $U_{GLE}$ that is already proportional to the phase difference between the frequencies to be compared ($f_{REF}$, $f_{MOT}$) but still exhibits signal disturbances. These signal disturbances are smoothed or filtered out in a second sample-and-hold element 13 that follows the first sample-and-hold element 11. The second sample-and-hold element 13 is triggered by a second sampling pulse sequence $T'_{ABT}$ that is acquired in a drive circuit 14 connected to the sampling pulse shaper 12. The output voltage of the second sample-and-hold element 13 is the phase difference signal $U_{PHA}$ of the phase comparator 4.

Sample-and-hold elements 11, 13 are described, for example, in the textbook "Halbleiter-Schaltungen", Tietze/Schenk, Axel Springer Verlag, 9th Edition, pages 954 through 959.

The commutation unit 8, for example, is designed as an electronic commutation that is controlled by the pulse transmitter 5, as a result whereof this is advantageously employed both for commutation as well as for generating the motor clock sequence $T_{MOT}$. An integrated circuit module of the type MC 33034-120 of Motorola, for example, can be employed for electronic commutation in combination with a power MOSFET output stage that is driven via switched current sources. The employment of a commutation, particularly of an electronic commutation, has the advantage that the quiet running of the motor 1 is improved. The commutation unit 8, however, can also be omitted given lower demands.

The motor 1, for example, is a DC voltage motor. Any motor whose speed is dependent on the respective feed voltage can be utilized.

What is achieved by the combination of the pulse shaper 9 with the signal generator 10 generating the sawtooth voltage $U_{SAG}$ as well as with the coupling to the first sample-and-hold element 11 is that shifts in the operating point of the motor 1 lead to a modification of the chronological sampling position in the domain of the output signal of the signal generator 10, a constant speed of the motor 1 resulting therefrom. In particular, small fluctuations in torque only lead to slight shifts of the sampling position, since the torque is essentially proportional to the motor current. A phase comparator having a linear transmission or transfer characteristic without a dead zone results.

Given employment of a sawtooth voltage $U_{SAG}$, the rise is to be selected such that both a sensitivity resulting from too great a slope as well as too loose a coupling of the motor 1 to the reference clock sequence $T_{REF}$ resulting from too slight a slope of the sawtooth voltage $U_{SAG}$ are avoided.

When a linear transmission or transfer characteristic is realized by the phase comparator 4, then it is possible to prescribe a constant loop gain and a constant bandwidth for the closed control loop.

Dependent on the dimensioning of the phase comparator 4, in particular it is possible to provide the control a low-pass characteristic of the second order. A low sensitivity to components tolerances results therefrom. The attenuation of the low-pass can be set via the dimensioning.

As a result of the drive circuit 14, the transmission or transfer characteristic of the phase comparator 4 can be varied within a very broad range. For example, a great steepness of the transmission or transfer characteristic enables a stationarily exact speed control at the operating point. Fundamentally, however, a defined, non-linear transmission or transfer can also be prescribed on the basis of selecting suitable parameters.

The phase difference identified in the phase comparator 4 correlates with the operating point of the motor 1. A frequency-locked phase comparator is thus realized that has a constant phase difference whose actual size is dependent on the respective operating point of the motor 1. A shift, for example, thus occurs dependent on a changing operating temperature or on changing torque relationships.

The smoothing or filtering with the assistance of the second sample-and-hold element 13 advantageously permits the motor 1 and thus the coupled load to exhibit quiet running without rotational jitter disturbances.

The employment of a controller 6 having PID behavior has the advantage that it has a significantly faster response behavior than a pure integral controller, but adequately damps the harmonics of the motor frequency due to an integral part.

Figure 2:
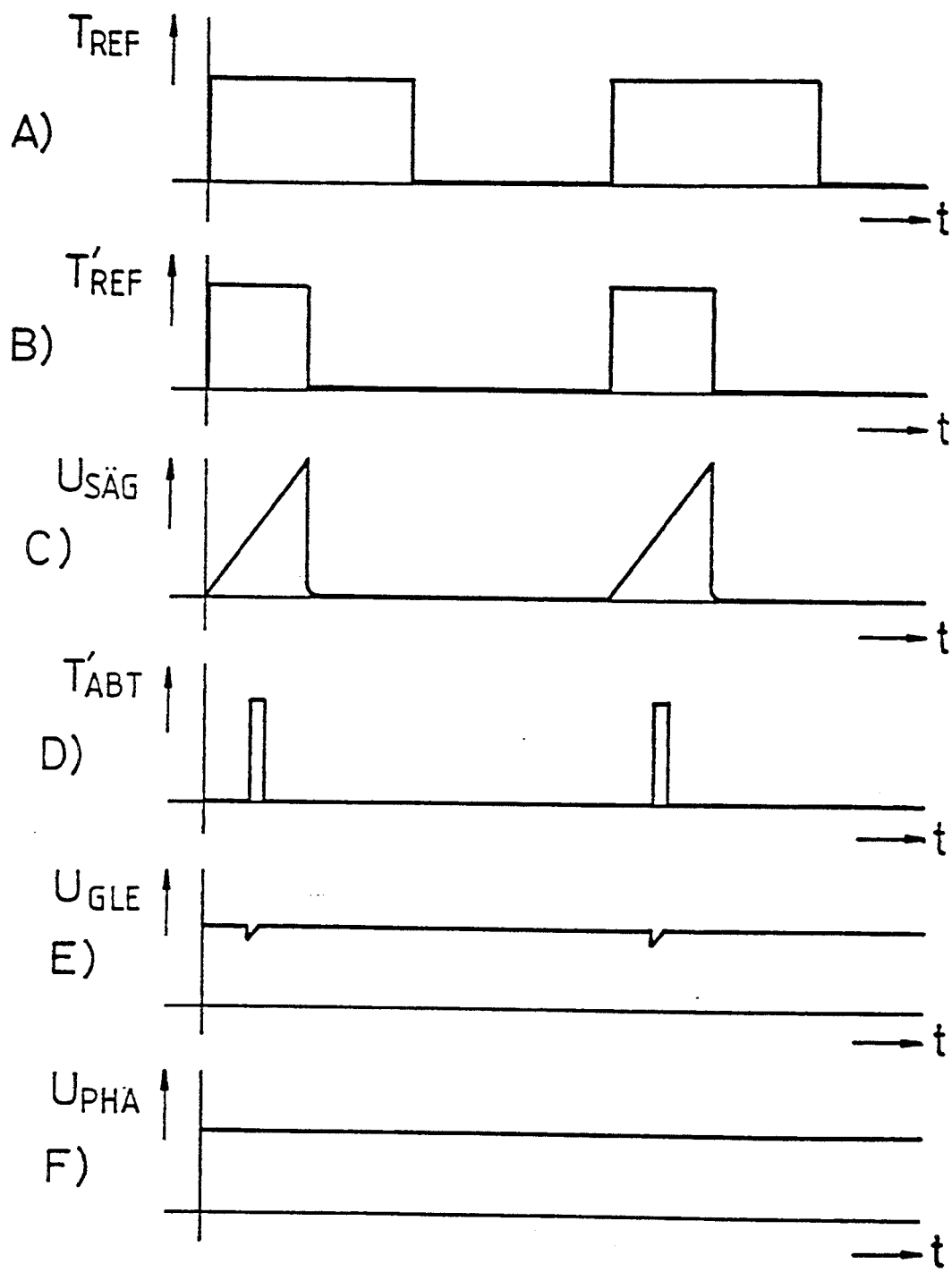
FIGS. 2A–2F show signal curves for illustrating the functioning of the apparatus.

FIG. 2 shows signal curves in a graphic illustration for illustrating the functioning of the apparatus of FIG. 1.

Graph A) shows the reference clock sequence $T_{REF}$ present at the output of the frequency divider 3. Graph B) shows the modified reference clock sequence $T_{REF}$ with constant pulse duration that is acquired in the reference clock pulse shaper 9. Graph C) shows the sawtooth voltage $U_{SAG}$ at the output of the signal generator 10 that is derived from the modified reference clock sequence $T'_{REF}$. Graph D) illustrates the first sampling pulse sequence $T'_{EBT}$ at the output of the motor clock pulse shaper 12 that is derived from the motor clock sequence $T_{MOT}$. Graph E) shows the DC voltage $U_{GLE}$ appearing at the output of the first sample-and-hold element 11, and Graph F) shows the smoothed phase difference signal $U_{PHA}$ at the output of the second sample-and-hold element 13 or at the output of the phase comparator 4.

Figure 3:
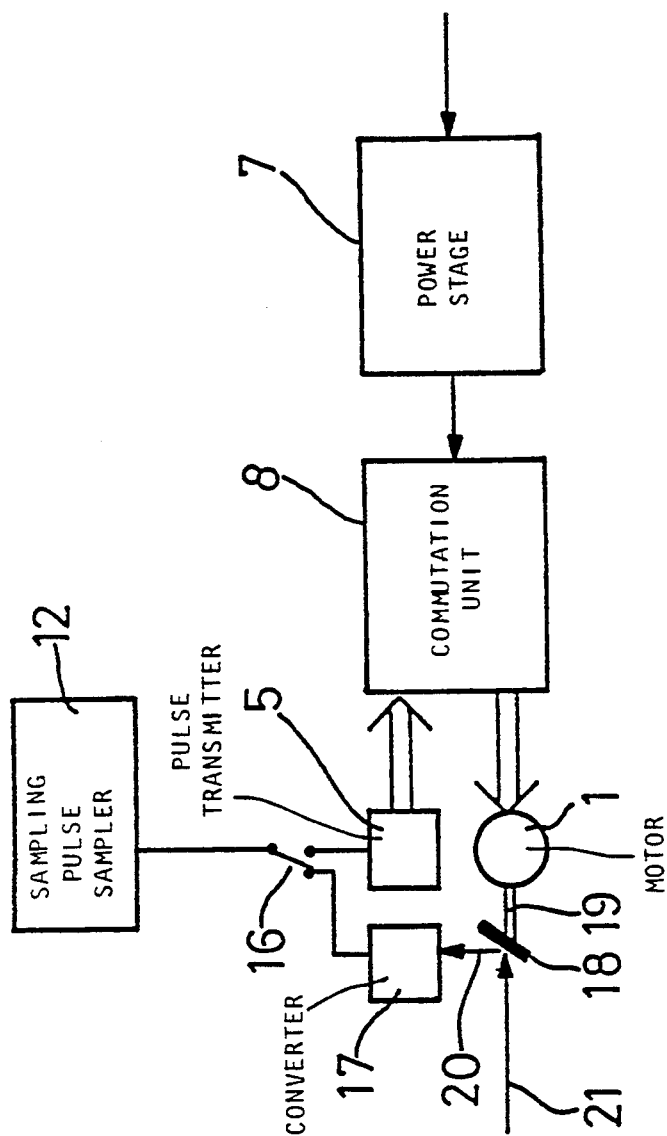
FIG. 3 is another exemplary embodiment of the apparatus.

FIG. 3 shows portions of another exemplary embodiment of an apparatus for speed stabilization having a modified arrangement for acquiring the speed of the motor 1.

This apparatus for speed stabilization can be advantageously employed in a scanner and recording apparatus in reproduction technology since high-precision motor drives for rotational motions and/or linear motions that are insensitive to disturbance are required therein. Via a switch-over means 16, either a signal of the pulse transmitter 5 or of an opto-electronic transducer or converter 17 can be optionally evaluated. An auxiliary beam 20 is supplied to the transducer or converter 17 via a rotating mirror 18 that is coupled to the motor 1 via a shaft 19. The auxiliary beam 20 is derived from a scanner beam 21 of a scanner or recording apparatus that is not shown in detail with which an original or a recording material is scanned point-by-point and line-by-line. In particular, it has been envisioned to derive a line start pulse from the scan beam 21. Due to the derivation of the speed information from the auxiliary beam 20 instead of from the measured values of the pulse transmitter 5, the appearance of synchronism fluctuations can be further reduced. An additional improvement in the quiet running can be achieved by employing bearings, and preferably air bearings, that are low in synchronism fluctuations.

Although various minor changes and modifications might be proposed by those skilled in the art, it will be understood that I wish to include within the scope of the patent warranted hereon all such changes and modifications as reasonably come within my contribution to the art.

I claim as my invention:

1. An apparatus for stabilizing speed of a motor, comprising:

a speed pulse transmitter for generating a speed signal indicative of a speed of the motor;

a reference signal generator for generating a reference signal;

a controller connected to a motor control circuit, and the motor control circuit connecting to the motor;

a phase comparator having a first input connected to said speed pulse transmitter and a second input connected to said reference signal generator for determining a phase difference between said reference signal and said speed signal and generating an output signal at an output that is proportional to the identified phase difference, said output of the phase comparator being connected to said controller; and said phase comparator comprising a pulse shaper connected to said second input to receive said reference signal, a signal generator connected to an output of the pulse shaper, a first sample-and-hold element having a first input connected to an output of said signal generator, a sampling pulse shaper connected to said first input to receive said speed signal and having an output connected to a second input of said first sample-and-hold element, and an output of said first sample-and-hold element connected to said controller.

2. An apparatus according to claim 1 wherein a second sample-and-hold element is connected following the first sample-and-hold element.

3. An apparatus according to claim 2 wherein a drive circuit is arranged between the sampling pulse shaper and said second sample-and-hold element.

4. An apparatus according to claim 1 further comprising a reference oscillator and a frequency divider connected to an output of the reference oscillator for generating said reference signal, an output of said frequency divider being connected to said input of said pulse shaper.

5. An apparatus according to claim 1 wherein said phase comparator comprises a linear transmission characteristic.

6. An apparatus according to claim 1 wherein said signal generator comprises a sawtooth generator.

7. An apparatus according to claim 1 wherein the pulse transmitter comprises a Hall sensor for detecting said speed of said motor and provides said speed signal.

8. An apparatus according to claim 1 wherein the pulse transmitter comprises an opto-electronic converter charged with a light ray for detecting said speed of the motor.

9. An apparatus according to claim 1 wherein said controller comprises a proportional integral and differential (PID) controller.

10. An apparatus according to claim 1 wherein said motor control circuit comprises an electronic commutation unit for implementation of a commutation of said motor.

11. An apparatus according to claim 1 wherein said motor control circuit comprises an electronic commutation circuit, and wherein said pulse transmitter is designed as a Hall sensor and is provided for detecting speed of the motor, said Hall sensor simultaneously controlling commutation of the motor via said electronic commutation unit.

12. An apparatus according to claim 1 wherein the motor comprises a DC motor.

13. An apparatus for stabilizing speed of a motor, comprising:

a speed pulse transmitter for generating a speed signal indicative of a speed of the motor;

a reference signal generator for generating a reference signal;

a motor control connecting to the motor;

a phase comparator having a first input connected to said speed pulse transmitter and a second input connected to said reference signal generator for determining a phase difference between said reference signal and said speed signal and generating an output signal at an output that is proportional to the identified phase difference, said output of the phase comparator being connected to said motor control; and said phase comparator comprising a pulse shaper connected to said second input to receive said reference signal, a signal generator connected to an output of the pulse shaper, a first sample-and-hold element having a first input connected to an output of said signal generator, a sampling pulse shaper connected to said first input to receive said speed signal and having an output connected to a second input of said first sample-and-hold element, and an output of said first sample-and-hold element connected to said motor control.

* * * * *